July 14, 1959    M. SCHWARZ ET AL    2,895,000
WETTING AGENT FOR ION-EXCHANGE RESIN BATTERY
Filed Oct. 23, 1957
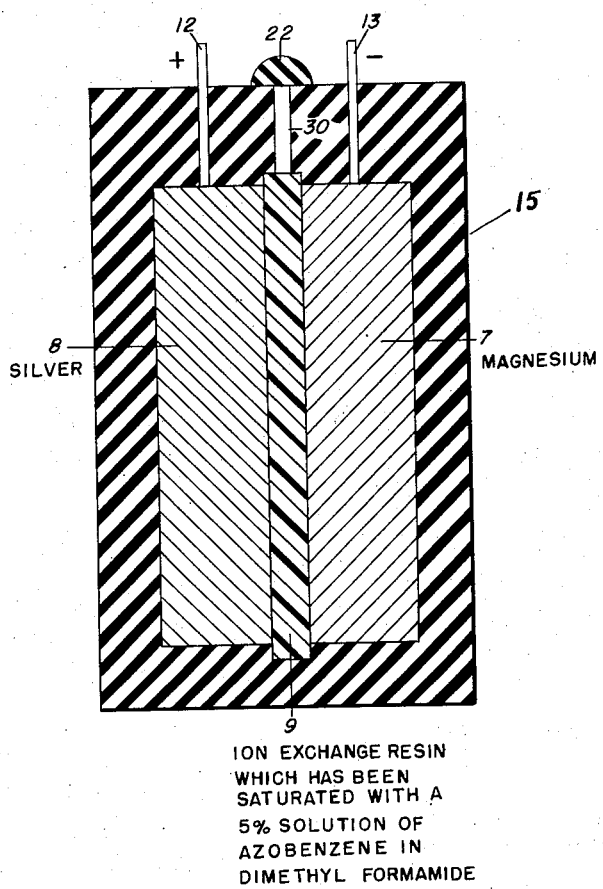
INVENTORS
MEYER SCHWARZ
PHILIP J. FRANKLIN
BY
*W. E. Thibodeau, T. J. Lynch, J. E. McGee & J. P. Edgerton*

2,895,000

WETTING AGENT FOR ION-EXCHANGE RESIN BATTERY

Meyer Schwarz, Kensington, Md., and Philip J. Franklin, Washington, D.C., assignors to the United States of America as represented by the Secretary of the Army Application October 23, 1957, Serial No. 692,013

3 Claims. (Cl. 136—100)

(Granted under Title 35, U.S. Code (1952), sec. 266)

The invention described herein may be manufactured and used by or for the Government for governmental purposes without the payment to us of any royalty thereon.

This application is a continuation-in-part of application S.N. 633,801, filed January 11, 1957, and now Patent No. 2,844,642.

This invention relates to the type of low-drain electrical cell or battery in which the electrolyte comprises an ion-exchange resin saturated with a suitable liquid. More particularly, this invention relates to means and methods for adapting these cells or batteries for operation at very low temperatures.

An ion-exchange resin battery is described in copending application S.N. 550,221, filed November 30, 1955, by William J. Pauli, now Patent No. 2,851,510. In the battery described by the Pauli application, an ion exchange resin such as sulfonated polystyrene is used in place of the conventional type of electrolyte. Upon wetting, the ion exchange resin becomes electrolytically conductive so as to serve as an electrolyte. Such batteries have an exceptionally long shelf life because the electrolyte is substantially in the solid state.

Unfortunately, despite their many advantages, ion-exchange resin batteries such as described in the copending application S.N. 550,221 are not useable at low temperatures. The need for ion-exchange batteries that are useable at low as well as high temperatures has existed for some time, but skilled persons have not been able to provide for this need.

It is a principal object of this invention, therefore, to provide an ion-exchange resin cell or battery capable of satisfactory operation at very high and very low temperatures.

An additional object is to provide novel means for preventing polarization in batteries of this type.

We have discovered that by using a dimethyl formamide as the wetting agent for the ion-exchange resin, satisfactory operation of an ion-exchange resin battery can be obtained for both very high and very low temperatures. We have further discovered that by adding to dimethyl formamide an organic compound which is easily reduced by nascent hydrogen, polarization can be prevented and a significant increase in the life and efficiency of operation of the cell thus attained.

The specific nature of the invention, as well as other objects, uses and advantages thereof, will clearly appear from the following description and from the accompanying drawing which is a sectional view of a battery cell in accordance with the invention.

In the drawing, the cell comprises a magnesium plate 7 and a silver plate 8, separated by a sheet 9 of cation exchange resin, preferably sulfonated polystyrene which has been saturated with a 5 percent solution of azobenzene in dimethyl formamide. The dimethyl formamide serves as a wetting agent so that the cation exchange resin 9 acts as an electrolyte. The 5 percent azobenzene is provided to prevent polarization of the silver plate 8 by hydrogen. The cell may be hermetically sealed in a casing 15 by well known means. The terminals 12 and 13, which are connected to the silver 8 and magnesium 7 plates respectively, and extend through the casing 15, may be provided to facilitate connection to an electrical load. The purpose of members 22 and 30 will be explained later.

When an electrical load is connected across the terminals 12 and 13, a current is generated by a process that involves a magnesium ion leaving the magnesium plate 7 to displace a mobile hydrogen ion of the resin sheet 9. This hydrogen ion is then free to deposit on the silver plate 8. This action is similar to that of other ion-exchange batteries. The fact that the dimethyl formamide has a high dielectric constant and low viscosity at low as well as high temperatures, in addition to having a low vapor pressure, makes possible the satisfactory operation of this cell at both high and low temperatures.

If the sulfonated polystyrene sheet 9 were saturated only with dimethyl formamide, polarization of the silver plate 8 would occur, reducing the life and lowering the efficiency of operation of the cell. It was found that this undesirable polarization would be prevented by adding to the dimethyl formamide solution, an organic compound which is easily reduced by nascent hydrogen. Enough of this organic compound should be added to prevent any polarization from occurring. The greater the polarization, the greater the amount of this organic compound that will be necessary. The amount of organic compound added is not critical and may be increased up to the point where the organic compound fails to dissolve in the solution. Examples of such organic compounds which are easily reduced by nascent hydrogen are: aromatic azocompounds, quinones, aromatic azoxy compounds, aromatic 1,2 diketones, and aromatic nitrocompounds. The addition of an organic compound of the above mentioned type has the further advantage of reducing the melting point of the solution still further so as to permit operation at even lower temperatures.

The drawing illustrates one example of an embodiment of a cell in accordance with the invention. One method for constructing such a cell is as follows. A one centimeter square sheet about 0.1 centimeter thick of a sulfonated polystyrene ion-exchange resin was soaked for a half hour in a 5 percent solution of azobenzene in dimethyl formamide. The saturated sulfonated polystyrene sheet was then placed between one centimeter square plates about 0.3 centimeter thick of magnesium and silver. The cell was then provided with terminals and hermetically sealed in a casing.

If the cell is not to be used in the near future, an alternate construction method may be followed to provide very long shelf life. An unsaturated sheet of sulfonated polystyrene may be placed between the silver and magnesium plates and the wetting agent solution added when it is desired to activate the cell. The drawing shows how this may be accomplished. After hermetically sealing the cell in the casing 15, a bore 30 may be provided extending down to the resin sheet 9. The bore 30 may then be sealed by well known means represented by sealing member 22. When it is desired to activate the battery, the sealing member 22 is unsealed and the wetting solution poured into the bore 30, thereby saturating the resin sheet 9 and activating the cell. After the resin sheet 9 is saturated, the bore 30 may be resealed.

Although only a single cell is illustrated in the drawing it will readily be apparent to those skilled in the art that any number of cells may be combined as desired. Cells and batteries in accordance with the invention have been found to operate successfully over the extreme temperature range of minus 85° F. to plus 307° F. Such temperature characteristics in a cell or battery of this type have never before been obtained.

It will be apparent that the embodiments shown are only exemplary and that various modifications can be made in construction and arrangement within the scope of the invention as defined in the appended claims.

We claim as our invention:

1. An ion-exchange resin cell comprising: a magnesium plate serving as a first electrode, a silver plate serving as a second electrode, and a sheet of sulfonated polystyrene interposed between said plates, said sheet being saturated with a solution of an organic compound in dimethyl formamide, said organic compound being of the type which is easily reduced by nascent hydrogen, the amount of said organic compound being sufficient to prevent polarization of said cell.

2. The invention in accordance with claim 1 wherein said organic compound is azobenzene.

3. The invention in accordance with claim 2 wherein said solution is a 5 percent solution of azobenzene in dimethyl formamide.

References Cited in the file of this patent

UNITED STATES PATENTS

| | | |
|---|---|---|
| 2,607,809 | Pitzer | Aug. 19, 1952 |
| 2,690,465 | Broder | Sept. 28, 1954 |
| 2,747,009 | Kirkwood et al. | May 22, 1956 |